US011726965B2

(12) United States Patent
Saunders et al.

(10) Patent No.: US 11,726,965 B2
(45) Date of Patent: Aug. 15, 2023

(54) USER-DIRECTED DIGITAL ASSET VAULT

(71) Applicant: Rearden Ventures Inc., Salt Lake City, UT (US)

(72) Inventors: Kenneth Lee Saunders, Sandy, UT (US); Stephen William Shillingford, Salt Lake City, UT (US)

(*) Notice: Subject to any disclaimer, the term of this patent is extended or adjusted under 35 U.S.C. 154(b) by 508 days.

(21) Appl. No.: 16/697,170

(22) Filed: Nov. 26, 2019

(65) Prior Publication Data

US 2020/0167318 A1 May 28, 2020

Related U.S. Application Data

(60) Provisional application No. 62/771,528, filed on Nov. 26, 2018.

(51) Int. Cl.
*G06F 16/18* (2019.01)
*H04L 9/06* (2006.01)
*G06F 16/176* (2019.01)
*G06F 16/11* (2019.01)
*G06F 21/60* (2013.01)

(52) U.S. Cl.
CPC ........ *G06F 16/1815* (2019.01); *G06F 16/113* (2019.01); *G06F 16/176* (2019.01); *G06F 21/604* (2013.01); *H04L 9/0637* (2013.01)

(58) Field of Classification Search
CPC .... G06F 16/113; G06F 16/176; G06F 21/604; G06F 21/6245; G06F 16/1815; H04L 9/0637; H04L 2209/38; H04L 9/3218; H04L 9/3239; H04L 9/0894; G06Q 50/01
See application file for complete search history.

(56) References Cited

U.S. PATENT DOCUMENTS

| | | | |
|---|---|---|---|
| 2015/0101026 A1* | 4/2015 | Kraus | H04W 4/21 726/4 |
| 2018/0082391 A1* | 3/2018 | Brody | G06Q 20/32 |
| 2019/0035431 A1* | 1/2019 | Attorre | G11B 27/036 |
| 2019/0253431 A1* | 8/2019 | Atanda | G06Q 30/0201 |
| 2022/0014352 A1 | 1/2022 | Shillingford et al. | |

\* cited by examiner

*Primary Examiner* — Hosain T Alam
*Assistant Examiner* — Chongsuh Park
(74) *Attorney, Agent, or Firm* — PCFB, LLC; Justin K. Flanagan

(57) ABSTRACT

Systems and methods are described herein to enable the automated and/or user-guided creation, collection, and curating of digital content items that represent a user's experiences, personality, interactions, and legacy. A digital trustee may be assigned to control access to the content after the death of the user. A user may create a death file with content items to be handled in a specific (e.g., user specified) manner after the death of the user. For example, the contents of the death file may be released to a family member or deleted by the system entirely.

16 Claims, 22 Drawing Sheets

700
My Stories    Friends' Stories >
| New Story | Story Ideas |
|---|---|
| 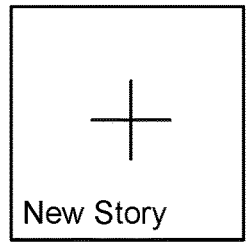 | 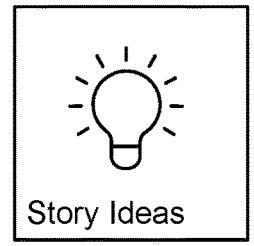 |
| College | My 40s |
| 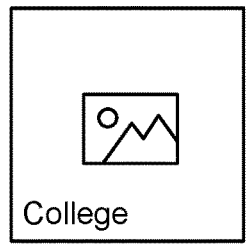 | 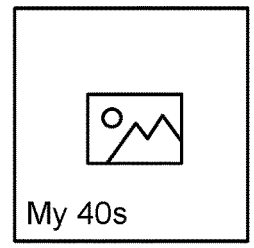 |
| Kids | Family |
| 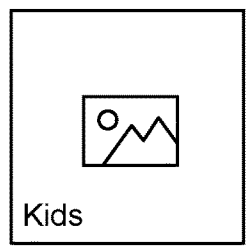 | 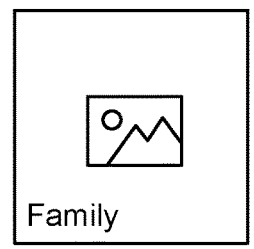 |
| Reunion | Career |
| 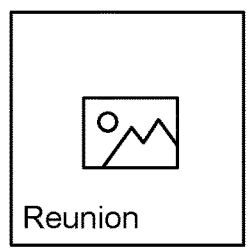 | 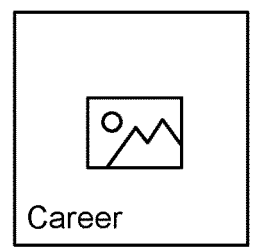 |
| Death File | Georgetown |
| 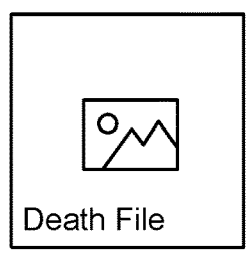 | 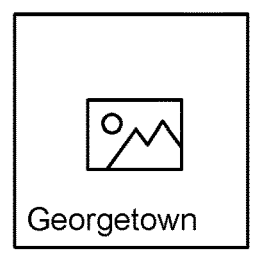 |
FIG. 7

1200

Edit Story

Edit Cover Image

My 50th Birthday Celebrations

Took it upon myself to add a little extravagance and world travel to my birthday.

1210 → Edit/Add Moments

☒ Bikini Boardroom  ☒ Martunis  ☒ London
☒ KBD  ☒ DC

1220 → Contributors & Viewers

☒ Elizabeth  ☒ Ashley  ☒ Theresa
☒ Kate  ☒ Christen

View Only

1230 → ☒ Jennie  ☒ Sue  ☒ Steve
☒ Annie  ☒ John  ☒ Mom

Edit    Publish

1300

Create New Story

1310

Upload Cover Image

1315

Name Story

1320

Description

1330

Add Moments

☒ Bikini Boardroom  ☒ Martunis  ☒ London

☒ KBD  ☒ DC

1340

Preview

1400

Share Story

Wesley Gibson — VIEW / CONTRIBUTE

Jeff Goodman — VIEW / CONTRIBUTE

Phoebe Singleton — VIEW / CONTRIBUTE

Ryan Stewart — VIEW / CONTRIBUTE

1500

My 50th Birthday Celebrations

✕

Bikini Boardroom

DC

London

Martunis

KBD

Holiday Newsletter Template

1710

Upload Cover Image

1715

Happy Holidays from the Bushes!

1725

It's been quite a year...

1730

Add Moments

☒ Ski Trip  ☒ College  ☒ Puppy  ☒ Party  ☒ 50th

1735

Preview

1800
Add a Moment
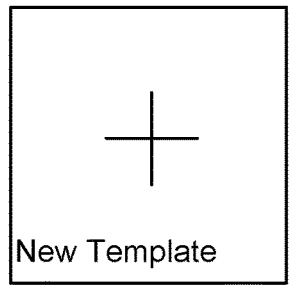
New Template
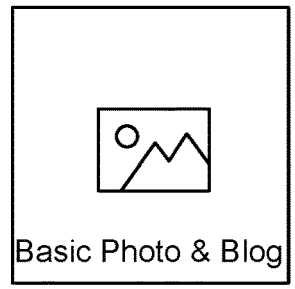
Basic Photo & Blog
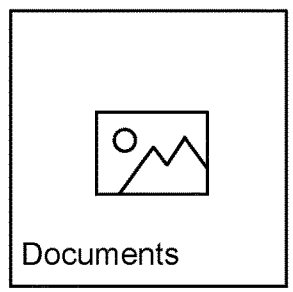
Documents
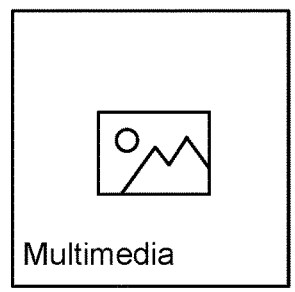
Multimedia
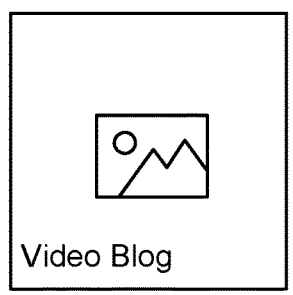
Video Blog
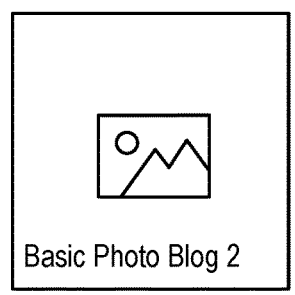
Basic Photo Blog 2
Milestone/Timeline
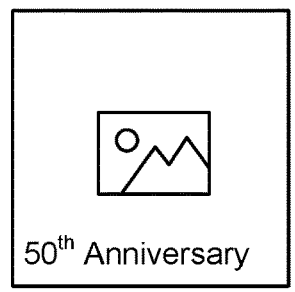
50th Anniversary
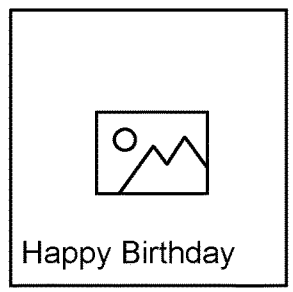
Happy Birthday
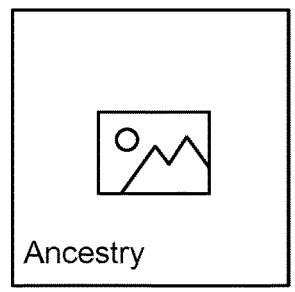
Ancestry
FIG. 18

1900

Create New Moment

| Name Moment |
|---|

Upload Content

1910

- ⬤ Take Photo    🖼 Upload Photo
- ⊕ Upload Doc    ⫿⫿ Add Playlist
- ▶ Add Video    → Write Journal

Add to these Stories

1920

☒ My 50s   ☒ Birthday   ☒ 2019

☒ Holiday Newsletter

Contributors & Viewers

1930

☒ Elizabeth   ☒ Ashley   ☒ Theresa

☒ Kate   ☒ Christen

View Only

1940

☒ Jennie   ☒ Sue   ☒ Steve

☒ Annie   ☒ John   ☒ Mom ( Preview )  ← 1950

USER-DIRECTED DIGITAL ASSET VAULT

RELATED APPLICATIONS

The application claims priority to and benefits under 35 U.S.C. § 119(e) to U.S. Provisional Patent Application No. 62/771,528 filed on Nov. 26, 2018, titled "User-Directed Digital Vault," which application is hereby incorporated by reference in its entirety to the extent it is not inconsistent herewith.

TECHNICAL FIELD

This disclosure generally relates to systems and methods for creating, collecting, sharing, and curating digital content, including photographs, documents, videos, and audio recordings.

BRIEF DESCRIPTION OF THE DRAWINGS

The written disclosure herein describes illustrative embodiments that are nonlimiting and non-exhaustive. Reference is made to certain of such illustrative embodiments that are depicted in the figures described below.

FIG. 7 illustrates an example graphical user interface (GUI) for a user to create new stories or navigate to view friends' stories (i.e., other users' stories), according to one embodiment.

FIG. 15 illustrates an example GUI for associating previously created moments with a story, according to one embodiment.

FIG. 18 illustrates an example of a GUI for creating a new moment content item from scratch or from a template, according to one embodiment.

FIG. 19 illustrates an example of a GUI for creating a new moment and uploading and associating various digital content items, according to various embodiments.

Figure 1:
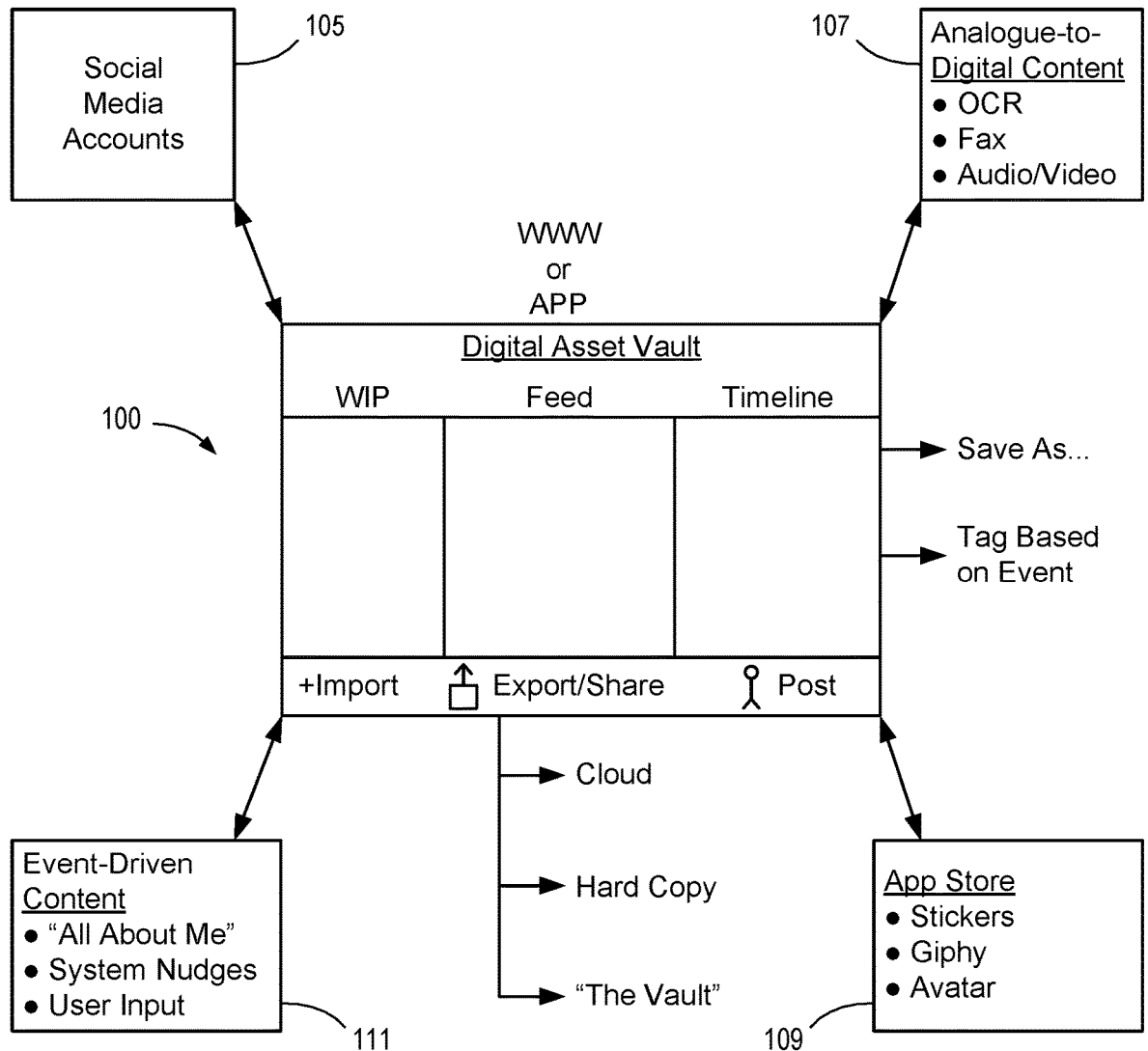
FIG. 1 illustrates a block diagram of some example functionalities of a digital asset vault system that may be available through a web portal or mobile app, according to one embodiment.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

This disclosure describes numerous possible features and functionalities that can be incorporated into a digital asset vault system. A digital asset vault system (referred to as simply "system" in many instances) may provide a user-directed and controlled digital asset vault. The digital asset vault allows any member of the system to create, collect, share, delete, control, and curate important information about themselves, their life experience, and their personal histories. The digital asset vault provides the analog of a genetic footprint in that it gives a user the ability to pass on the "nurture elements" of their life history in much the same way genetic material passes on "nature elements" to a user's future generations.

A user can leverage current formats and techniques for creating meaningful, curated content about themselves, their values, their interests, likes, dislikes, motivations, and other things that make up their personalities. In some embodiments, the content is enhanced by systems and methods that support a user's attestations, including systems and methods that utilize augmented and virtual reality. For example, the content may include selected writings from a wide variety of sources (e.g., documents, email, tests, blog posts, tweets, etc.), photos and videos derived from one or more platforms (e.g. smartphone, camera, social networking platform, gaming systems, etc.), as well as other representative input collected via scanning, faxing, optical character recognition or any other means to transform physical artifacts into digital representations.

Examples of such content may also include pictures, videos, messages, etc. from physical devices (e.g. smartphones, laptops, internet of things (IoT) devices, etc.) and web-based platforms (e.g. social networking sites, email services, news sites, etc.). As described herein, the system enables the customization and curation of this content for the purposes of memorializing and sharing with any user-designated social circles (e.g. family, friends, colleagues, etc.) during the user's life and after the user's life in a controlled manner.

In various embodiments, the digital asset vault system is more than mere aggregation of data stored on various social media and other data storage platforms. The digital asset vault system facilitates, encourages, reminds, and aids the user in curating a custom selection and arrangement of digital content. In various embodiments, a user may link the digital asset vault platform to various websites and sources of digital content. A customized curation interface may facilitate the selection and curation of content from the linked platform(s).

The system may utilize a web, desktop, and/or mobile application to provide users with a personalized setup process. A user may provide personal information during setup that may guide the system in sharing some initial and ongoing organizational templates based on a user's desired preferences, responses to automated system prompts based on a user's preferences, tracked activities, and/or the like. The system may leverage machine-learning techniques to decide the types of content to add to a user's profile and in making template suggestions. In various embodiments, users can initiate a profile, set sharing parameters, and provide federated access to members of that user's social circles (e.g., family, friends, associates, etc.).

The system may be hosted in a cloud-based infrastructure and secured with a zero-knowledge architecture, where all cryptographic security measures rely on only the user being able to unlock and access their profile. Administrator access may not be allowed, and any breach of the cloud-based servers would likely only provide an attacker with a cryptographic blob of information. Users may export their entire vault without delay in a portable file format for use on third-party systems. Categories of information aggregated by the system include, by way of example but not limitation, user-generated free text, multimedia, links to third-party platforms, automated inputs from third-party systems, and any and all physical-to-digital transformation techniques.

Information stored on the system by the user may be protected in an encrypted file format. The user may uniquely control access and/or any of a wide variety of access-control and other security approaches may be utilized. In some embodiments, without the access rights granted by the user (or subsequently by those designated as "digital rights trustees" by the user), the information stored on the system is rendered unreadable.

Many embodiments of the systems described herein enable the user to create, collect and curate information about their life history using various multimedia formats including written text, recorded voice, pictures, video, and digitally rendered avatars. A digital rights trustee may not be given access to all digital content. Instead, in the context of the digital asset vault system, a digital rights trustee may have and/or control access to only the curated and selected digital content within the digital asset vault system. Thus, the carefully curated and customized content on the digital asset vault platform remains within the control of the digital rights trustee and can be shared with selected individuals and entities.

Once a user creates an account and goes through the initial onboarding process, the system may automatically, or per user-defined settings, prompt the user at various intervals with questionnaires on certain subjects (for example, early childhood memories, family history, school history, friends, teenage memories, military experience, key influences, favorite movies, books, music, etc.).

In various embodiments, the system may allow users to go at their own pace or select certain topics they would like to cover. In other embodiments, the system may require or prompt a user to follow a pre-defined, user-selected, or user-defined prompting schedule.

Users may create their own subjects and/or questionnaires that are answered once, at a predefined future date, or periodically per user-defined prompting settings associated with the subjects and/or questionnaires. Users may share their customized subjects and/or questionnaires with specific friends or a broader digital asset vault community. A marketplace associated with the community may allow for monetization by users and/or the operator of the digital asset vault system. In some embodiments, the system may include one or more subjects/questions by default and/or available for purchase.

After users have started to populate their account with information, they may select from a variety of formats (written text, voice recording, video recording, avatar playback, etc.) by which they wish to have specific information available for consumption by those granted access rights.

The system may tag stored information with metadata that will enable all content (words, sound, pictures, video) to be searchable based on keywords. Metadata may be encoded with hypertext links that allow consumers to quickly and easily access additional details on associated information available in the system.

For example, a user may list their five favorite books. A user, or the system, may embed each book with hyperlinks to connect future consumers of the information to Wikipedia pages with more information on the books as well as hyperlinks to e-commerce sites where the book may be purchased. The system may enable the consumer to create a closer connection and/or form a closer bond with the original user who uploaded the information.

The system may allow the user to grant access rights to their stored information to certain individuals, such as immediate family members. The system may also allow a user to determine the timing on when such access will be permitted. As previously described, the system allows the user to designate certain individuals with the authority take over the control of future access rights to their information. Information on individuals granted access rights and/or those designated as a Digital Rights Trustees may be stored to the blockchain to make the access rights immutable and incorruptible.

The system includes tools to enable users to import information (words, pictures, video, sound) previously uploaded to other social media platforms such as Facebook®, Twitter®, LinkedIn®, YouTube®, or Instagram®. In various embodiments, users have the absolute ownership of their information stored in the digital asset vault system. Without the consent of the user or the Digital Rights Trustee, the information is not shared with anyone else.

In various embodiments, the users may remove their information from the system and/or export their information in various formats. In various embodiments, the Digital Rights Trustee cannot remove the information from the system.

In some embodiments, a user may store a sample of their DNA to the system in addition to any other information they may choose to upload. In some embodiments, if the user chooses to store their DNA to the system, the stored DNA may be used to confirm ancestry and grant access rights in cases where no access rights or Digital Rights Trustees remain associated with the account.

In various examples, the system may include hardware, software, firmware, and/or combinations thereof to implement modules, systems, and subsystems—which terms are used interchangeably unless context dictates otherwise.

The system may provide examples, templates, ideas, and/or questions intended to prompt ideas to help users create story content items (or simply "stories"), moment content items (or simply "moments"), and/or the like. Templates and other content may be created by operators of the system, third party companies, and/or other users. In some instances, templates and other content may be freely available, available only to subscribers, and/or available in a marketplace for user-set fees or free.

The system may, for example, include templates for stories and/or moments for milestones (e.g., births, marriage, religious ceremonies, deaths, new homes, birthdays, etc.). The system may periodically or continually ask a user questions to get to know them better and make more meaningful suggestions and/or template recommendations. The system may, in some embodiments, follow other social media activity of users to identify events that should be included in the system. The system may try to ask questions relevant to their personal experiences and life stages. For example, the system may ask about the moon landing to older users but not to younger users.

In various embodiments, a user may create stories, moments, and/or other content and then invite family, friends, or others to edit or supplement the content they have created. In some embodiments, a user may choose to make some content public, some content visible to friends and family, some content available to only close family or even a single other individual. In still other instances, it may be desirable to maintain some content completely private until after death—at which time it may be desirable to share such content. For example, personal journals may be kept private during life, but shared after death. Accordingly, the system may allow a user to create a death file with specific instructions for how the contents of the death file should be handled after the user's death.

A digital asset vault system may include a processor and a computer-readable medium with instructions stored thereon that, when executed by the processor, cause the processor to implement a set of modules or subsystems. The system may include server-based software, client-side software, mobile apps, hardware components, specific custom hardware designed for creating and curating content, or any combination thereof. In various embodiments, a profile module or onboarding subsystem may obtain personal data from a user to create a personal account for the user.

The user may have complete control over who else may see and who else has access to created content. For example, a circle management module may enable the user to connect to other users of the digital asset vault system and create connected-user groups (e.g., friends, family, work colleagues, hobbyists, etc.). In some embodiments, the system may automatically make groups or unions of existing groups that might facilitate content sharing, collaboration, and discussion.

A content curation module may provide a graphical user interface to facilitate user uploads of digital content items, such as digital photographs, audio recordings, video recordings, electronic documents, scanned documents, images, graphics, and text (e.g., types, dictated, or the like). An invitation module may receive a request from the user to invite other users (e.g., friends) to edit digital content items and/or other content created by the user. The invitation module may forward or transmit the invitation to view and/or edit the user-created content. A template module may suggest templates to users, receive user-created templates for inclusion in a library of templates, and/or manage the types of templates displayed to different users to provide relevant suggestions.

As previously described, in some embodiments, a death file module may receive digital content items from the user identified as death-file content items. The death file module may receive instructions from the user specifying actions to be taken with respect to the death-file content items following the death of the user. The system may confirm or receive confirmation that the user has died and then implement the actions specified by the user with respect to the death-file content items. In some embodiments, the death file may be cryptographically encrypted as part of a blockchain-based smart contract that provides for the release of a decryption key for decrypting the death-file content items only after the death of the user and as part of the terms of the smart contract.

As previously described, the system may allow for digital rights trustees to manage access to content after a user has become incapacitated and/or passed away. A digital trustee module may manage the creation and editing of digital rights trustees. The digital trustee module may prompt the user to identify an entity to be the digital rights trustee. The user may specify a set of access rights to be granted to the identified digital rights trustee with respect to the user's content stored within the digital asset vault system. Furthermore, the user may specify a triggering event that will lead to the assignment of the specified set of privileges to the digital rights trustee. Once the defined event has occurred, the digital rights trustee may be granted the specified rights and privileges. A questionnaire module may manage questions asked of a user to improve recommendations and/or prompt ideas. In some embodiments, the questionnaire module may create custom or semi-custom content items based on responses to questions. The questionnaire module may suggest that the user share or publish the created content items.

In some embodiments, a marketplace for templates may allow a user to exchange, give away, and/or earn money for creating, distributing, sharing, and/or selling templates. An open system in which users may create templates may encourage innovation community collaboration. Moment and story creation modules and/or subsystems may facilitate the creation, editing, and sharing of user-created moments and stories. The moment and story creation modules and/or subsystems may facilitate the association of uploaded digital content items (e.g., photos, videos, etc.). Additionally, moments that are generally shorter and simpler than stories may be associated with stories.

For example, a story may cover a relatively long time period during which a user may have created many relevant or related moments. The user may decide to associate some or all of these moments with the story. The association may simply constitute a link to the related content. Alternatively, the associated moments may be explicitly duplicated within the story or moved into the context of the story.

In one specific example, a digital asset vault system enables a user to create, upload, store, and share a plurality of stories relating to, for example, various life events. The user may also create, upload, store, and selectively share various moments (e.g., moment content items) throughout the year. During a particular holiday season or life event specific to the user, the system may make an additional graphical user interface available to allow for the creation of special content items.

For instances, a holiday season module or subsystem may allow a user to select a holiday template, such as a holiday card or holiday newsletter and then incorporate the previously created moments and/or stories into the holiday template. For example, a holiday newsletter may be quickly created that includes a handful of moment content items that summarize the year in a suitable manner for a holiday newsletter.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture, such as a computer-readable storage medium, a method, and/or a product of a process.

The phrases "connected to" and "in communication with" refer to any form of interaction between two or more components, including mechanical, electrical, magnetic, and electromagnetic interaction. Two components may be connected to each other even though they are not in direct contact with each other and even though there may be intermediary devices between the two components.

Some of the infrastructure that can be used with embodiments disclosed herein is already available, such as: general-purpose computers, computer programming tools and techniques, digital storage media, and communications networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer-readable storage device such as non-volatile memory, static RAM, dynamic RAM, ROM, CD-ROM, disk, tape, magnetic, optical, flash memory, or other computer-readable storage medium.

Suitable networks for configuration and/or use as described herein include one or more local area networks, wide area networks, metropolitan area networks, and/or "Internet" or internet protocol (IP) networks, such as the World Wide Web, a private Internet, a secure Internet, a value-added network, a virtual private network, an extranet, an intranet, or even standalone machines which communicate with other machines by physical transport of media. In particular, a suitable network may be formed from parts or entireties of two or more other networks, including networks using disparate hardware and network communication technologies. A network may incorporate landlines, wireless communication, and combinations thereof.

The network may include communications or networking software, such as software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

Various input devices and/or output devices may be utilized in conjunction with the presently described systems and methods. Exemplary input devices include, but are not limited to, virtual reality input devices, augmented reality input devices, a keyboard, mouse, touch screen, light pen, tablet, microphone, sensor, or other hardware with accompanying firmware and/or software. Exemplary output devices include, but are not limited to, a monitor or other display, audio outputs, virtual reality interfaces, augmented reality interfaces, printer, switch, signal line, or other hardware with accompanying firmware and/or software.

Some specific embodiments of the disclosure may be further understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The software modules described herein tangibly embody a program, functions, and/or instructions that are executable by computer(s) to perform tasks as described herein. Suitable software, as applicable, may be provided using the teachings presented herein and programming languages and tools, such as XML, Java, Pascal, C++, C, database languages, APIs, SDKs, assembly, firmware, microcode, and/or other languages and tools. Additionally, software, firmware, and hardware may be interchangeably used to implement a given function. Software modules and modules described in the context of a computer-readable storage medium may be implemented in hardware, firmware, software, and/or combinations thereof, as appreciated by one of skill in the art.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

In the following description, numerous details are provided to give a thorough understanding of various embodiments; however, the embodiments disclosed herein can be practiced without one or more of the specific details, or with other methods, components, materials, etc. In other instances, well-known structures, materials, or operations are not shown or described in detail to avoid obscuring aspects of this disclosure.

FIG. 1 illustrates an example graphical user interface 100 of a digital asset vault system which may utilize cloud storage, hard copy versions, and/or digital "vault" storage systems. Various social media accounts 105 and other digital repositories of media may be linked to the system. Event-driven content 111 may include an "all about me" section of personal profile information, provide automatic system nudges, and/or be responsive to user inputs. An analog-to-digital content subsystem 107 may facilitate optical character recognition (OCR) of hard copy media. An application store or marketplace 109 may enable selective access to additional free materials, user-created content, subscription-based content, content for purchase, etc.

Figure 2:
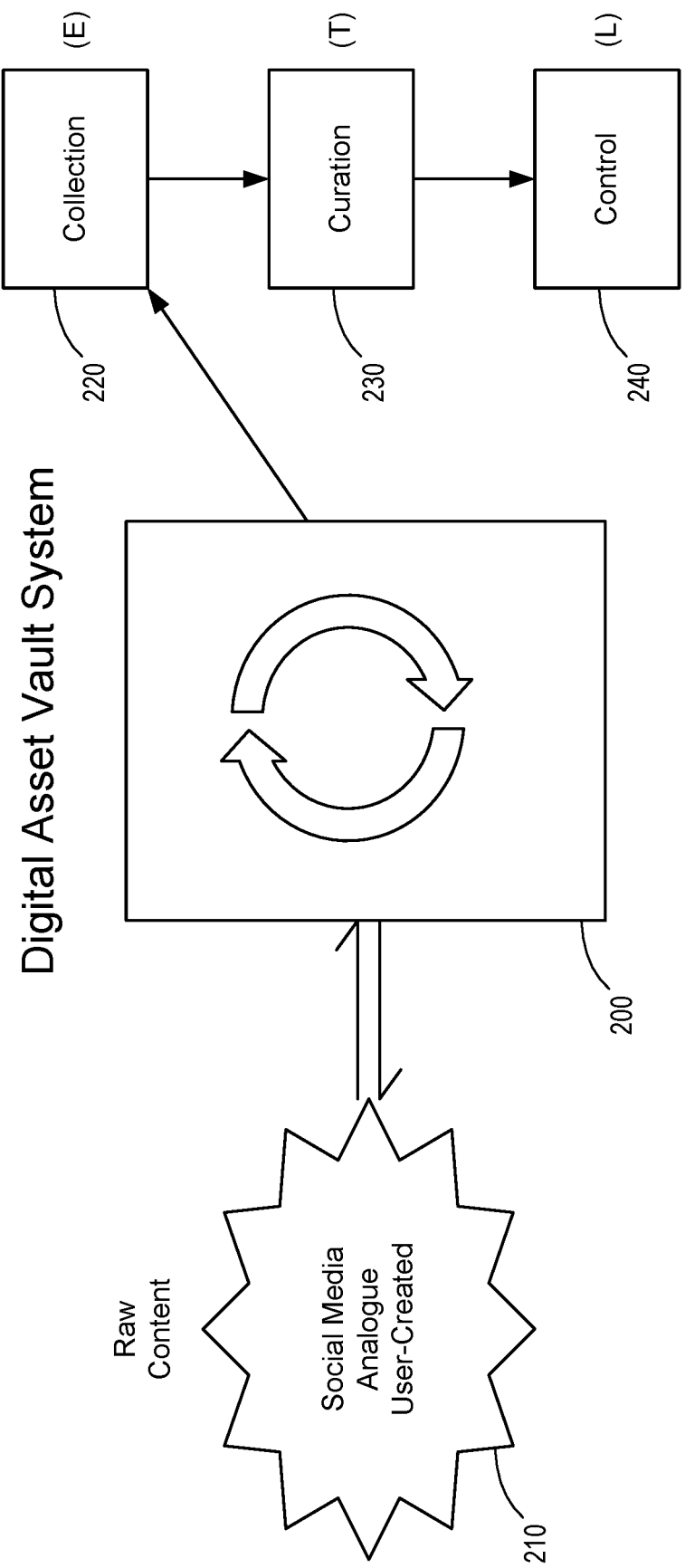
FIG. 2 illustrates a high-level block diagram of a step-by-step process for improved management of digital assets, according to one embodiment.

FIG. 2 illustrates a high-level block diagram of a step-by-step process for improved management of digital assets, according to one embodiment. A digital asset vault system 200 may import raw content 210 from existing or abandoned social media content. The digital asset vault system 200 may guide the user through a process of collection 220 and curation 230 of the digital content. A control subsystem 240 or module allows a user to have complete control of current and future access controls, including future access control through a human or computer-enabled digital rights trustee.

Figure 3:
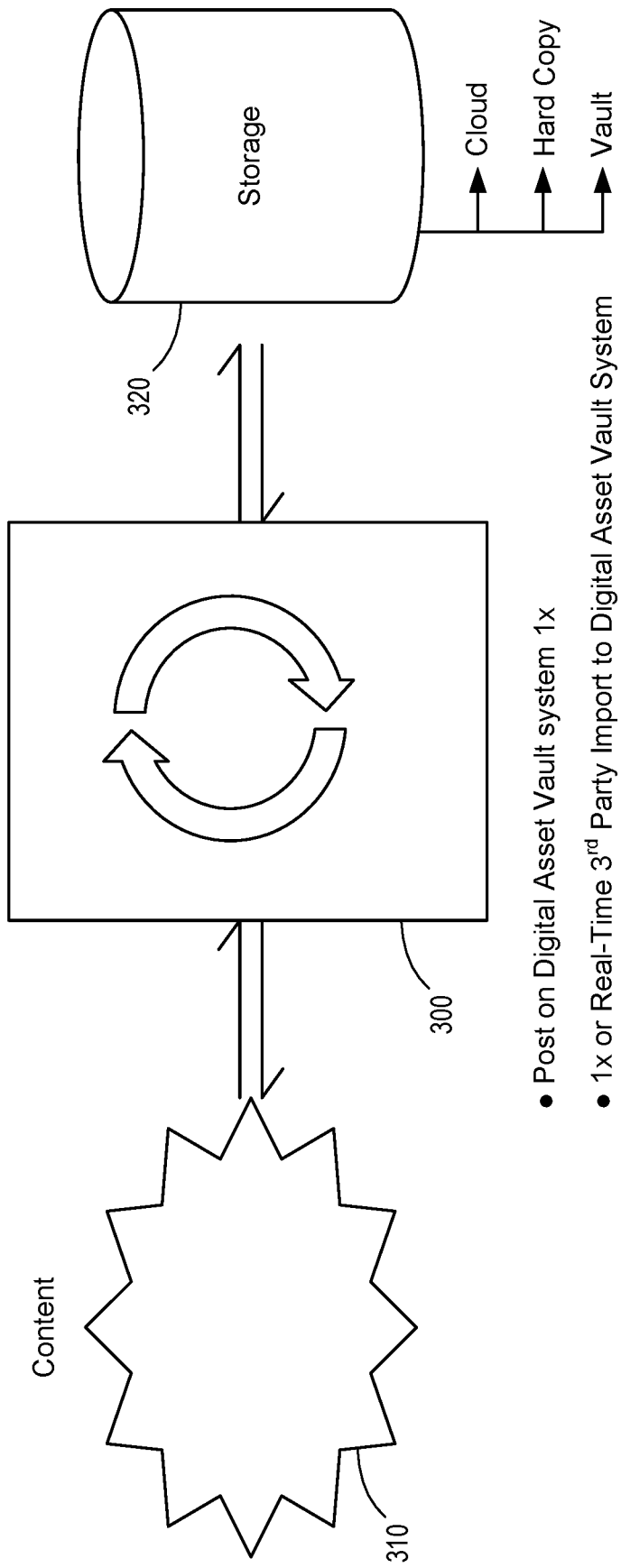
FIG. 3 illustrates another block diagram of a digital asset vault system identifying some potential functionalities, according to one embodiment.

FIG. 3 illustrates another block diagram of a digital asset vault system 300 that receives content 310 through a rough, medium, or find-grained import process for eventual safe keeping within storage 320. The storage 320, may, for example, comprise cloud storage, hard copy storage, or vault storage. Content created within the digital asset vault system may be automatically sent to multiple other online sites. For example, a digital asset vault content item may be selectively or automatically uploaded to one or more social media accounts, backup storage locations, and/or digital displays, or sent via text messages, emails, and/or other online or electronic communication media.

Figure 4:
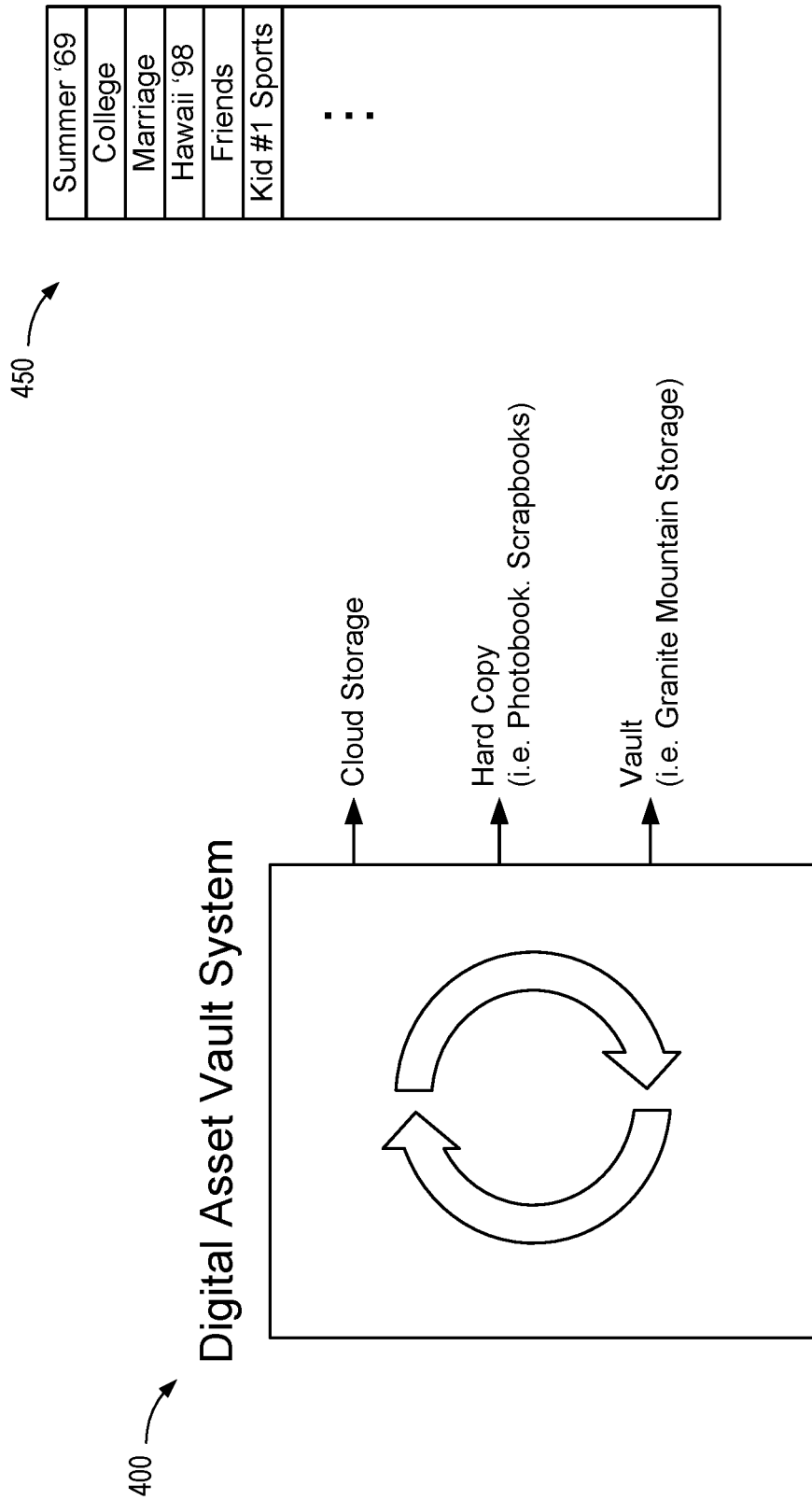
FIG. 4A illustrates another high-level block diagram of a digital asset vault system with optional export or storage options, according to one embodiment.
FIG. 4B illustrates an example timeline of life events that may each be associated with various digital content items stored within the digital asset vault system, according to various embodiments.

FIG. 4A illustrates a block diagram of one possible layout of the digital asset vault system 400 for a user, according to one embodiment. The content created, curated, modified, collected, or otherwise provided to the digital asset vault system under an automated or user-guided process may be stored in the cloud, in hard copy format (e.g., photobooks, scrapbooks, books, prints, etc.) and/or archived in a digital and/or hardcopy format within a vault (e.g., a physically secure bank vault, a granite mountain storage, within a fireproof safe, etc.).

FIG. 4B illustrates an example timeline 450 of life events that may each be associated with various digital content items stored within the digital asset vault system 400 in FIG. 4A, according to various embodiments.

Figure 5:
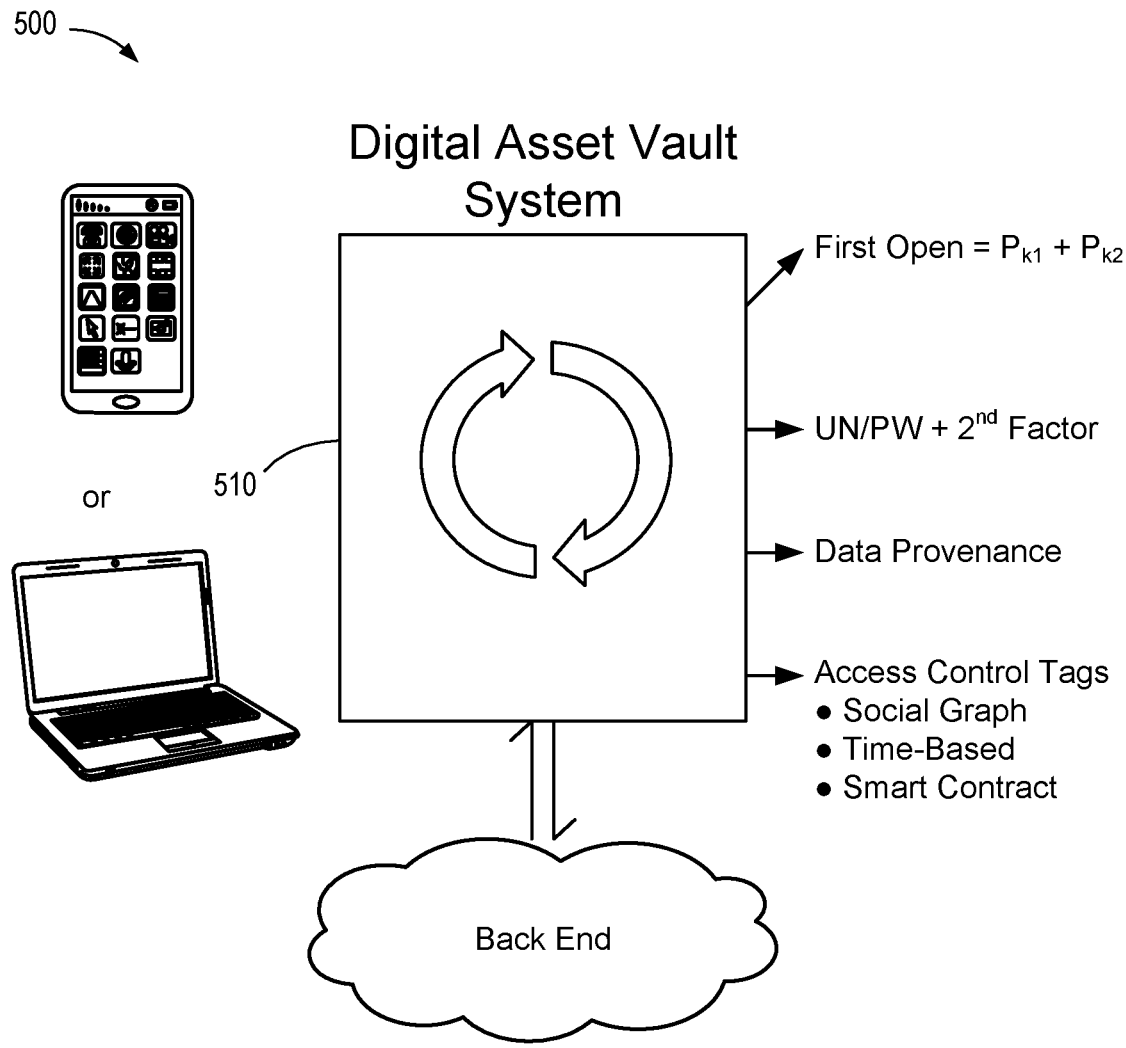
FIG. 5 illustrates an example block diagram of the digital asset vault system integrating with third-party systems for one-time or ongoing content collection and curation, according to one embodiment.

FIG. 5 illustrates an example block diagram 500 of the digital asset vault system 510 integrating with third-party systems for one-time or ongoing content collection and curation, according to various embodiments. As illustrated, various authentication methods may be used to ensure immediate and future security.

Access control tags may provide social graphs, time-based actions and visualizations, and/or smart contract-based transactions. In various embodiments, the infrastructure and underlying web-based or app-based software may be stored locally, remotely, and/or in the cloud. In some embodiments, users may have discretion as to how specific data is stored and/or distributed. In various embodiments, data storage and access may be implemented and/or modified based on the citizenship and/or country of residence to comply with applicable security, health data, personal data, financial data, privacy laws, and/or other applicable industry norms, regulations, rules, and laws.

Figure 6:
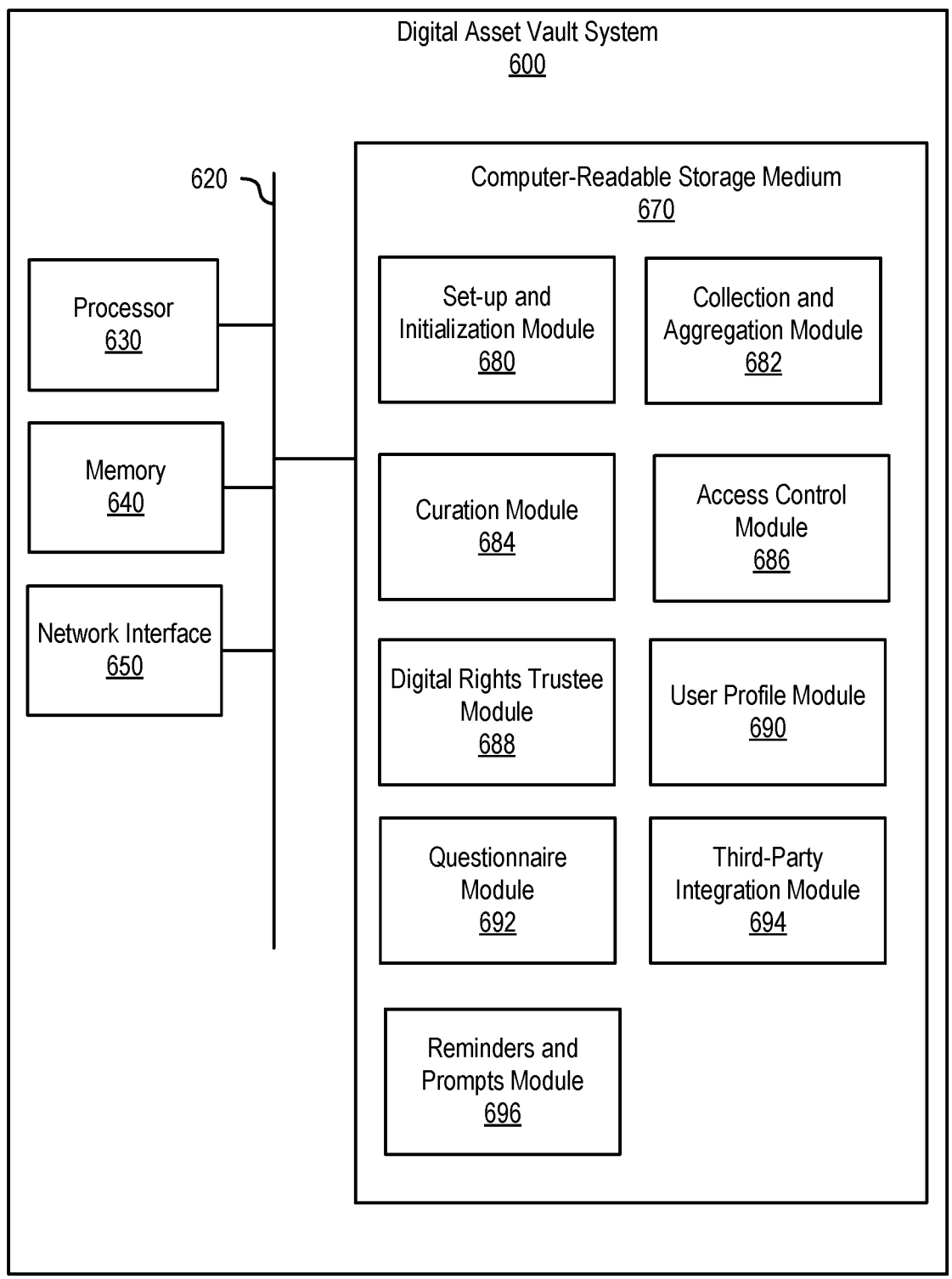
FIG. 6 provides a block diagram of an example of a computing system to perform the systems and methods described herein, according to one embodiment.

FIG. 6 provides a block diagram of an example of a digital asset vault system 600 with a processor 630 and memory 640 in communication with a network interface 650 and a computer-readable storage medium 670 via a bus 620. The computer-readable storage medium 670 may include a plurality of modules 680-696 that may, as illustrated, be implemented as software modules that interact via network interface 650 and/or via processor 630 with external hardware. In other embodiments, one or more of the modules 680-696 may be implemented in hardware, firmware, software, and/or combinations thereof.

A set-up and initialization module 680 may facilitate the initial setup of a user by collecting personal information and/or identifying what additional modules and subsystems may be useful for a full integration into the system 600. A curation module 684 may facilitate creating, adding, and editing content added to the system 600. The curation module 684 may, in some embodiments, be divided into submodules or subsystems to handle specific types of content items. For example, the curation module 684 may comprise a moment creation module, story creation module, and/or associated template management, creation, and recommendation modules or subsystems.

A digital rights trustee module 688 may allow for digital rights trustees to manage access to content after a user has become incapacitated and/or passed away. The digital trustee module 688 may manage the creation and editing of digital rights trustees. The digital trustee module 688 may prompt the user to identify an entity to be the digital rights trustee. The user may specify a set of access rights to be granted to the identified digital rights trustee with respect to the user's content stored within the digital asset vault system 600. Furthermore, the user may specify a triggering event that will lead to the assignment of the specified set of privileges to the digital rights trustee. Once the defined event has occurred, the digital rights trustee may be granted the specified rights and privileges.

A questionnaire module 692 may manage questions asked of the user to improve recommendations and/or prompt ideas. In some embodiments, the questionnaire module 692 may create custom or semi-custom content items based on responses to questions. The questionnaire module 692 may suggest that the user share or publish the created content items.

A reminder and prompts module 696 may provide periodic reminders or nudges to encourage the habit of journaling or other content creation on a regular basis. Collection and aggregation module 682 may integrate with third-party databases and/or websites collect, curate, format, and aggregate content created by the user in many prior locations.

An access control module 686 may manage access to user-created content. For example, a user may set varying permissions and grant varying access rights to different friends and family members (other users). A user profile module 690 may facilitate updates and modifications to various user profile settings, such as password changes. A third-party integration module 694 may facilitate continual integration and interoperability with third party social media networks to help with duplicate posting and/or content transfers.

FIG. 7 illustrates an example GUI 700 for a user to create new stories or navigate to view friends' stories (i.e., other users' stories), according to one embodiment. FIG. 7 also lists a number of templates and ideas to help get a user started with a story. Examples, templates, and ideas for stories may include those relating to college, kids, reunions, specific ages, family members, families in general, careers, bosses, co-workers, and/or specific locations.

Figure 8:
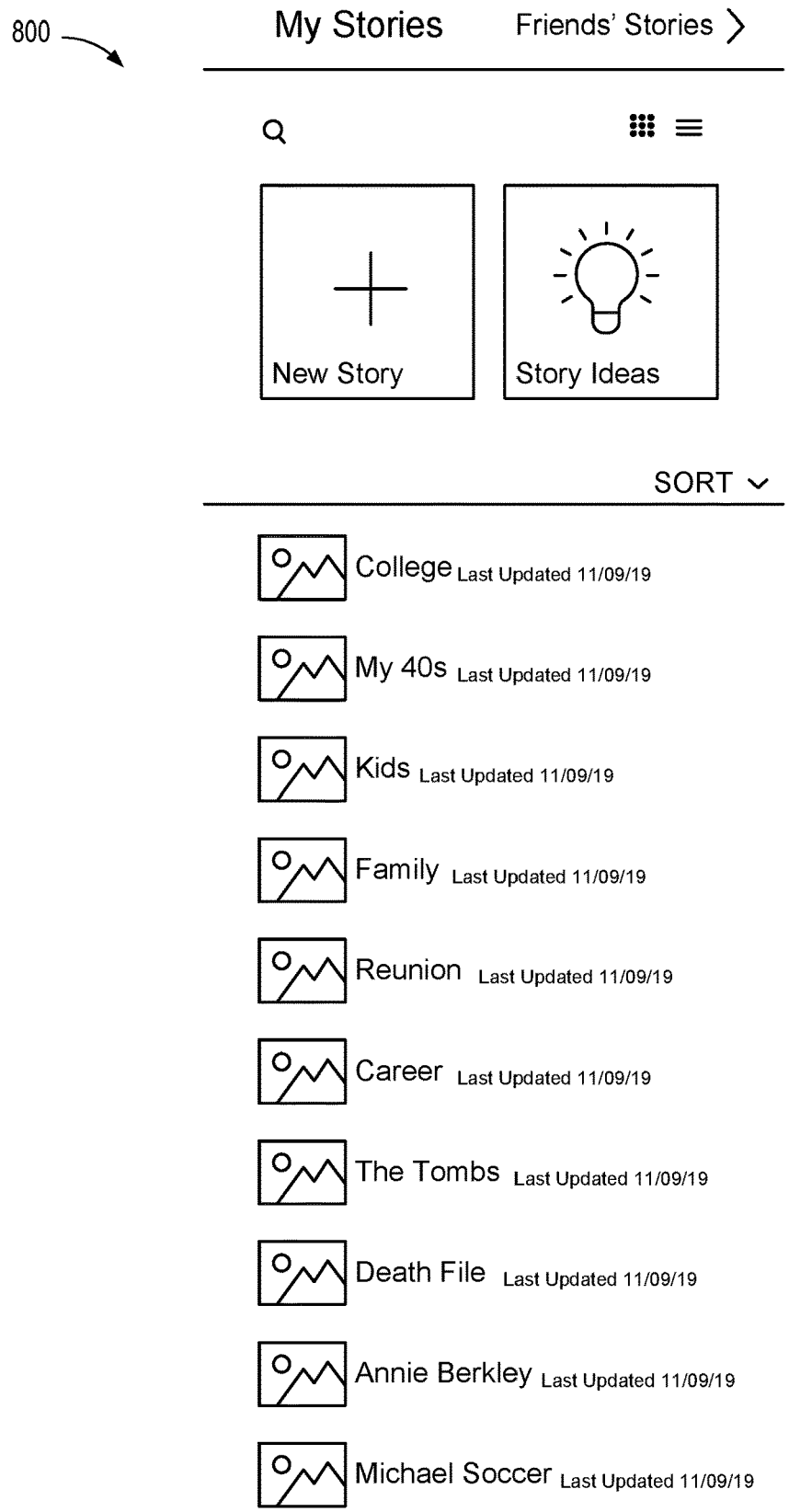
FIG. 8 illustrates another view of the GUI for a user to create new stories or navigate to view friends' stories, according to one embodiment.

FIG. 8 illustrates another view of the GUI 800 in a list view instead of the tiled view of FIG. 7. The user may prefer tiled or list views of the GUI 800 depending on the device a user is using (e.g., a cell phone as compared to a laptop). In other instances, list and tile views may be preferred depending on the number of templates, examples, and ideas listed in a given GUI.

Figure 9:
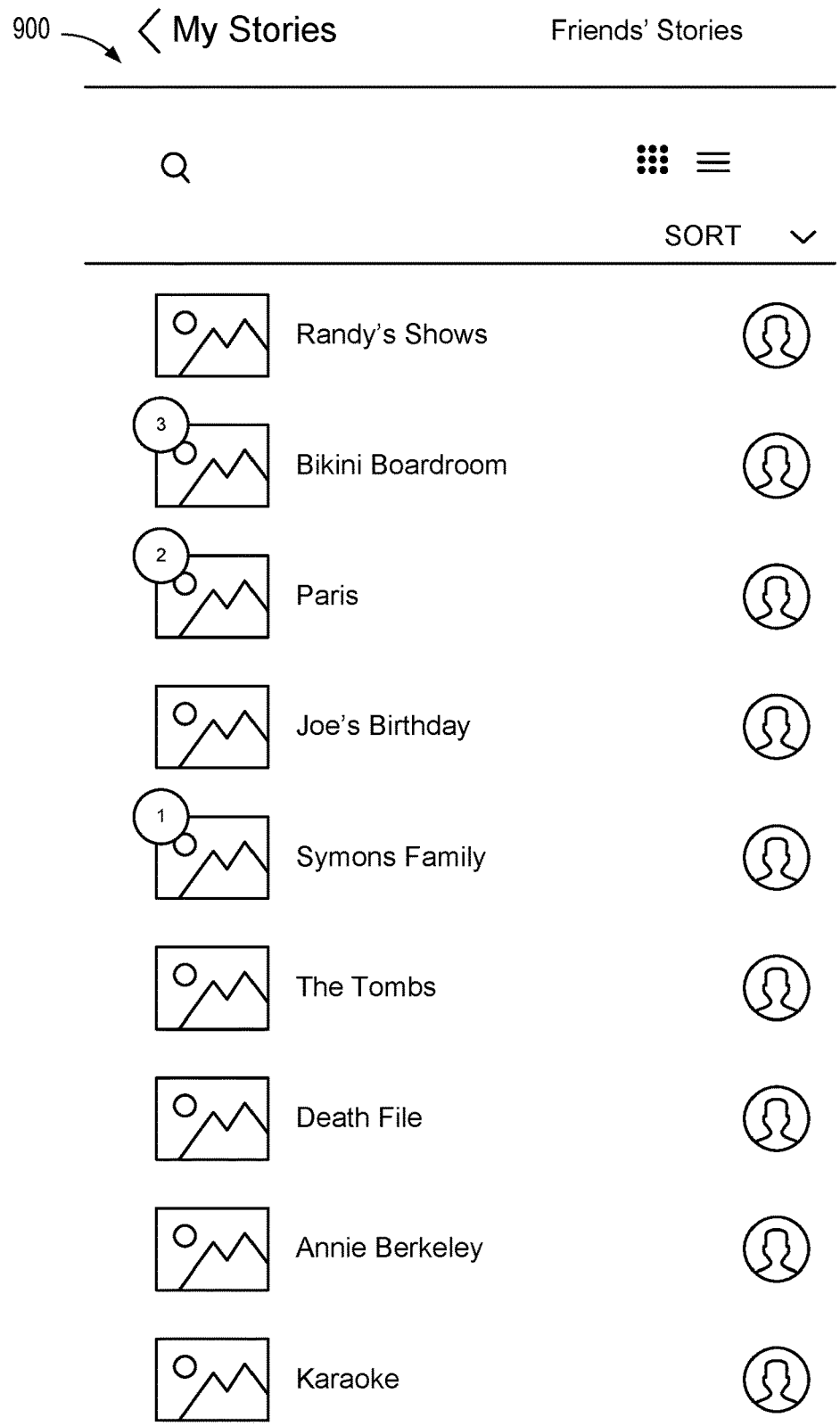
FIG. 9 illustrates an example of a list view GUI for the user to navigate previously created stories, according to one embodiment.

FIG. 9 illustrates an example of a list view GUI 900 for the user to navigate previously created stories, according to one embodiment. The user may select a specific story to view it, edit it, review it, make changes to sharing preferences, or the like. Sort and/or filter functions may allow the user to quickly find a particular story. As in other embodiments, tiled and list views may be available to suit the particular preferences of each user.

Figure 10:
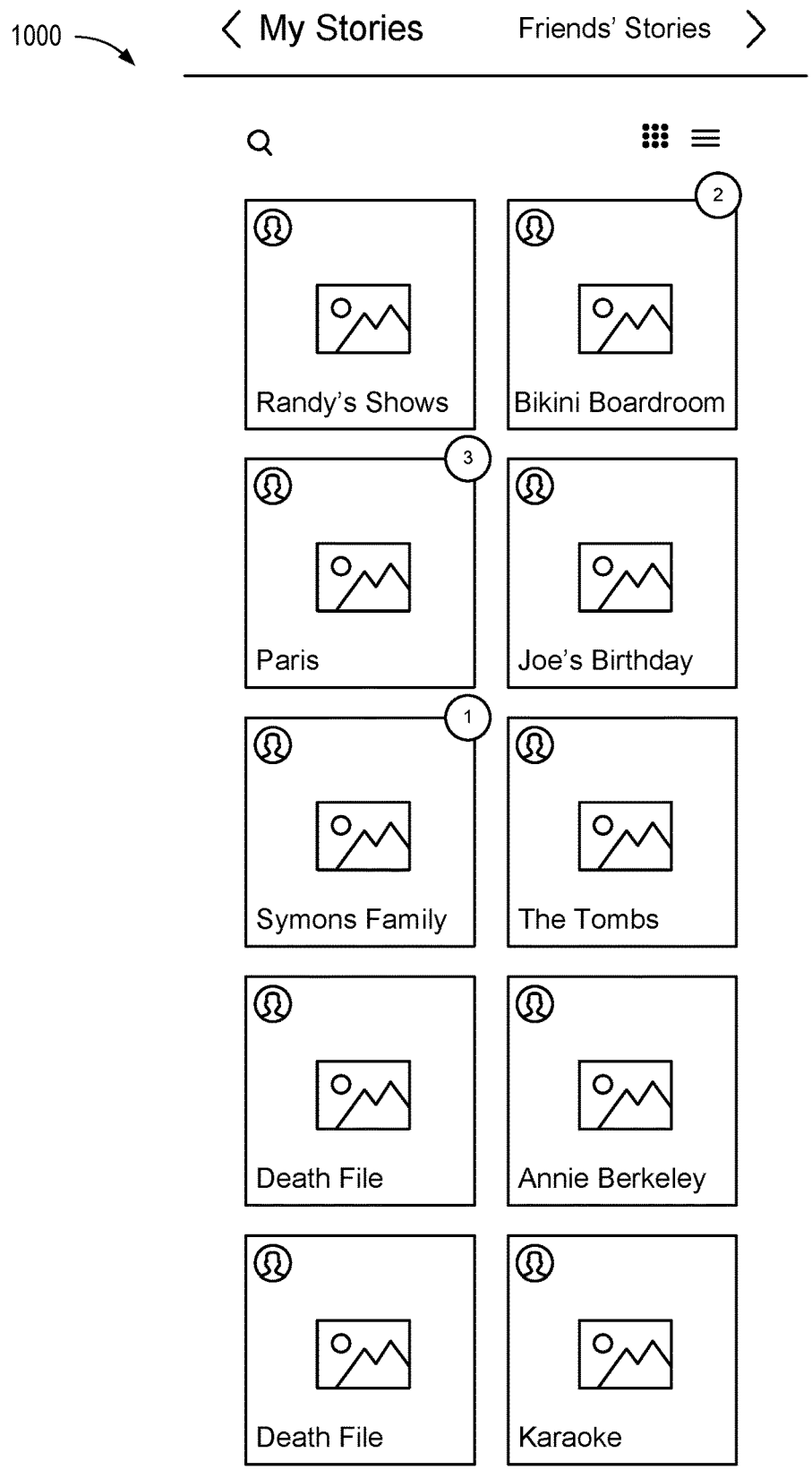
FIG. 10 illustrates an example of a tiled view GUI for the user to navigate previously created stories, according to one embodiment.

FIG. 10 illustrates an example of a tiled view GUI 1000 for the user to navigate previously created stories, as described in conjunction with FIG. 9 and according to various embodiments.

Figure 11:
FIG. 11 illustrates an example of a GUI for viewing, editing, or publishing a story created by the user, according to one embodiment.

FIG. 11 illustrates an example of a GUI 1100 for viewing, editing, or publishing a specific story created by a user, according to one embodiment. The user may edit the title, the layout of the cover page, the imagery on the cover page, and/or other aspects of the story. Edit and publish buttons are self-explanatory and easily accessible to a user.

Figure 12:
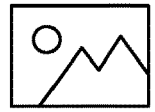
FIG. 12 illustrates an example of a GUI for editing an existing story, according to one embodiment.

FIG. 12 illustrates an example of a detailed GUI 1200 for editing an example "My 50$^{th}$ Birthday Celebrations" story, according to one embodiment. As illustrated, titles and captions may be easily modified. Additionally, there are options to add or associated moments 1210 with the story. Access privileges of friends and family can be adjusted to allow some of them to contribute and view 1220 and others to view only 1230.

Figure 13:
FIG. 13 illustrates an example of a GUI for creating a new story, according to one embodiment.

FIG. 13 illustrates an example of a GUI 1300 for creating a new story, according to one embodiment. Artwork, graphics, or photos may be uploaded as a cover image 1310. The user may provide a name 1315 for the story and provide a text description 1320. Moments 1330 may be added to the story and, once the story is completed, the user may preview 1340 the story prior to publishing.

Figure 14:
FIG. 14 illustrates an example of a GUI for managing the access of others to a story created by the user, according to one embodiment.

FIG. 14 illustrates an example of a GUI 1400 for managing the access of others to a story created by the user, according to one embodiment. Each of the four listed users may be granted no access, view-only access, and/or approval to contribute to the story.

FIG. 15 illustrates an example GUI 1500 showing a specific example of a story as a work in progress with a moment being selected for association therewith.

Figure 16:
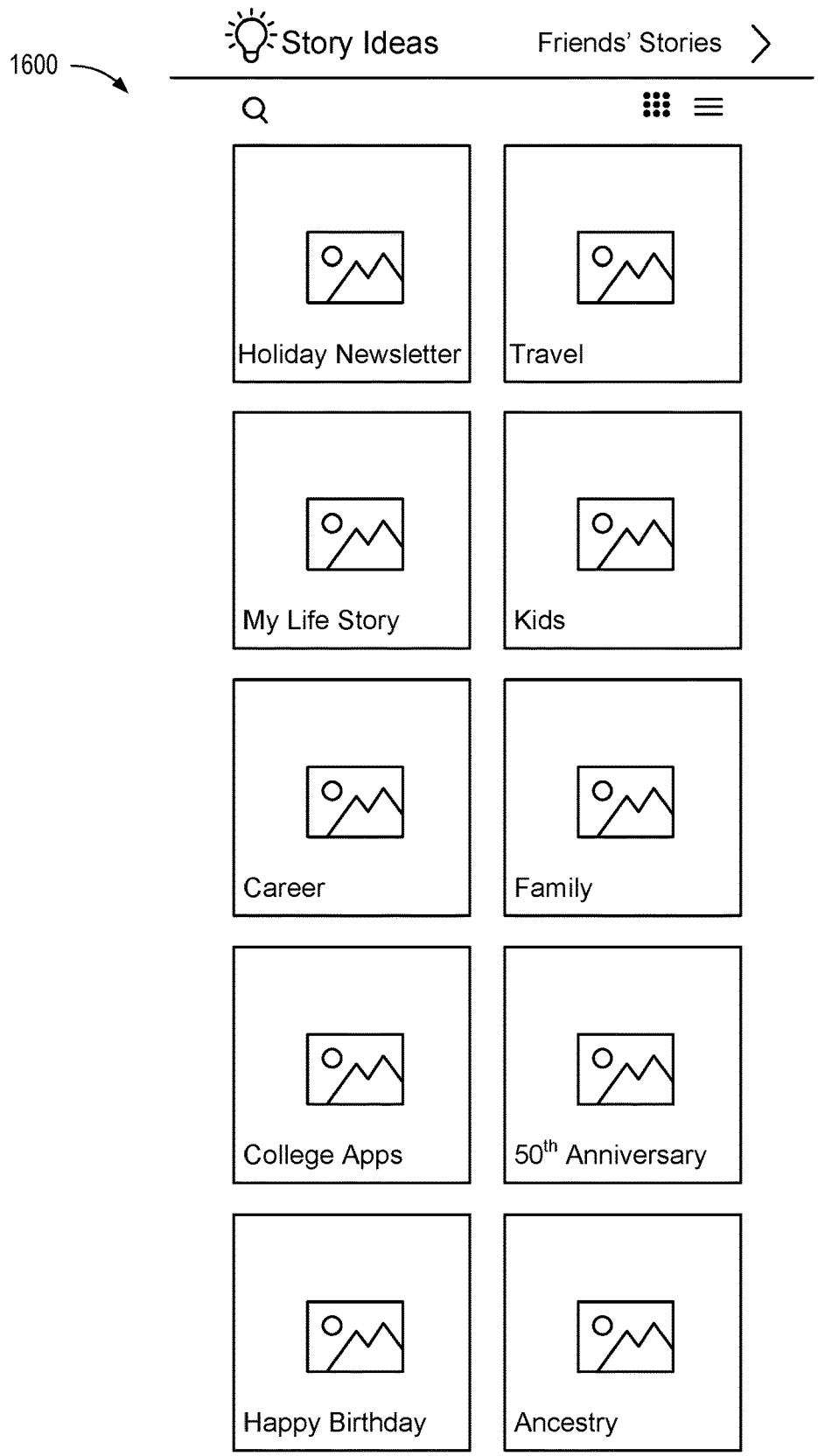
FIG. 16 illustrates an example GUI providing a user with examples, ideas, and templates for creating new stories, according to one embodiment.

FIG. 16 illustrates an example GUI 1600 providing a user with additional examples, ideas, and/or templates for creating new stories, according to various embodiments. The system may select templates and/or ideas it believes will be more relevant. For example, templates and ideas may be specifically selected based on the user age, likes and dislikes, and other identifying characteristics.

Figure 17:
FIG. 17 illustrates an example GUI for generating a holiday newsletter using a template that allows for the incorporation of previously created stories and/or moments, according to one embodiment.

FIG. 17 illustrates an example GUI 1700 for generating a holiday newsletter using a template that allows for the incorporation of previously created stories and/or moments 1730, according to various embodiments. In some examples, when a moment 1730 is added, the cover image 1710, description 1715, and/or detailed description 1725 may be partially pre-populated.

FIG. 18 illustrates an example of a GUI 1800 for creating a new moment content item from scratch or from a template, according to one embodiment. Example moments may be created based on documents, videos, special days, photos, etc.

FIG. 19 illustrates an example of a GUI 1900 for creating a new moment and uploading and associating various digital content items 1910, such as photos, documents, videos, music, and/or journal entries. Similarly, previously created stories 1920 may be associated with the moment. As in other examples, the user may select who can view 1940 the content and who can also contribute 1930 to the content, according to various embodiments.

Figure 20:
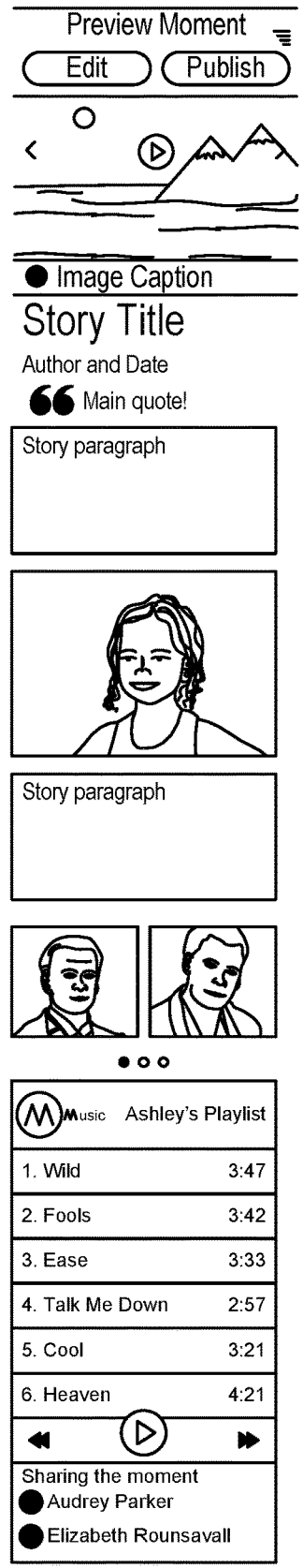
FIG. 20 illustrates an example of a GUI for previewing a moment content item prior to publishing, according to one embodiment.

FIG. 20 illustrates an example of a GUI 2000 for previewing a moment content item prior to publishing, according to one embodiment.

Figure 21:
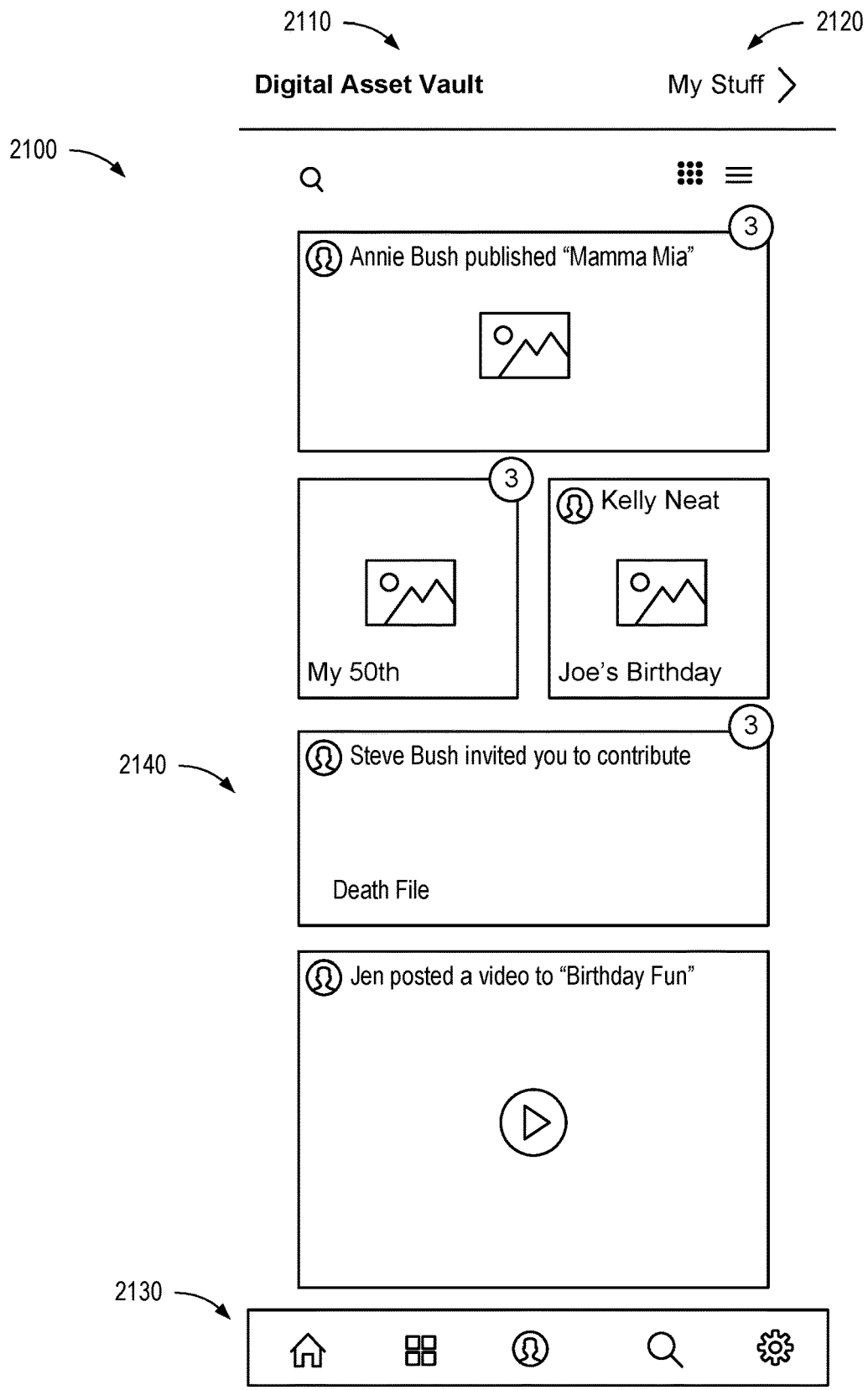
FIG. 21 illustrates an example of a possible home or landing page of a digital asset vault system, according to one embodiment.

FIG. 21 illustrates an example of a possible home or landing page 2100 of a digital asset vault system, according to one embodiment. As illustrated, a particular company brand may be included to replace the generic name "digital asset vault" 2110. The user may navigate quickly to personal content items via the "My Stuff" link 2120. A toolbar 2130 may allow for general navigation within the app as well. The main body 2140 of the landing page 2100 may present the user with the latest updates from friends and family and/or provide reminders and nudges.

Figure 22:
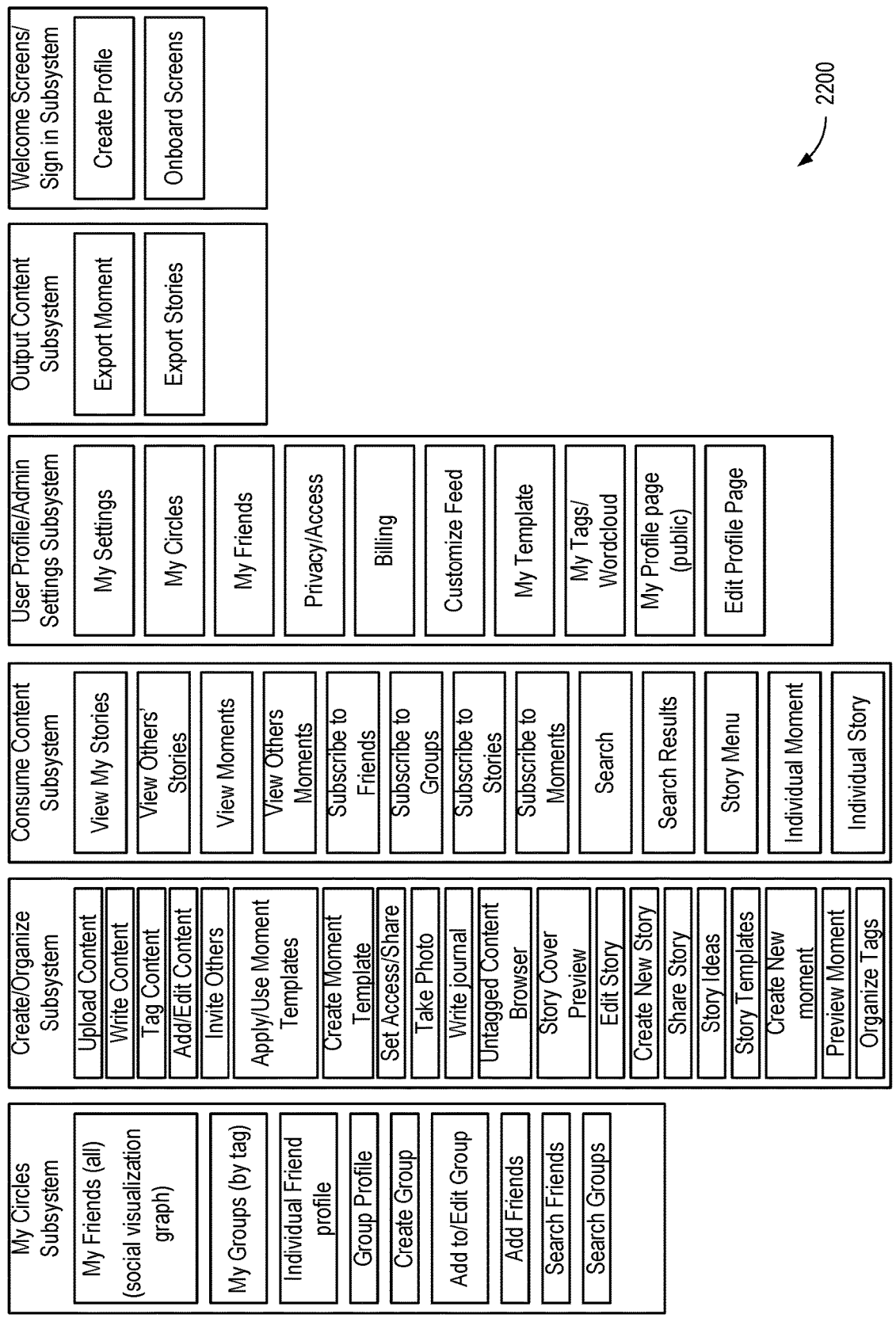
FIG. 22 illustrates a block diagram of the various functionalities available through various embodiments of the digital asset vault systems and associated methods described herein.

FIG. 22 illustrates a dense block diagram 2200 of the numerous functionalities available through various embodiments of the digital asset vault systems and associated methods described herein. The concepts are divided into six general categories of features. Specifically, a "My Circles" subsystem may allow for complete management of the circles and groups of friends. The next column is a content creation and organization subsystem listing numerous functionalities for creating, tagging, editing, inviting, sharing, previewing, and organizing content. A consume content subsystem may include various functionalities for viewing, sharing, subscribing, and searching the stories, moments, groups, and other content items in the system. Profile and management subsystems provide the user with complete administrative control of the account. In various embodiments, an output content subsystem allows moments and stories to be exported for inclusion on other social media platforms, for printing, for backup, and/or any other purpose. Welcome and sign-in subsystems may facilitate a seamless signup process and subsequent greetings with each return to the system.

The above description provides numerous specific details for a thorough understanding of the embodiments described herein. However, those of skill in the art will recognize that one or more of the specific details may be omitted, modified, and/or replaced by a similar process or system. The scope of the present disclosure should be determined to encompass at least the claims presented below.

What is claimed:

1. A digital asset vault system, comprising:
a processor and a computer-readable medium with instructions stored thereon that, when executed by the processor, cause the processor to implement a set of modules with which a user may interact via one or more graphical user interfaces (GUIs) displayed on an electronic display, the set of modules including:
a profile module to receive personal data from a user and create a personal account for the user accessible via user access credentials;
a circle management module to enable the user to:
connect to other users of the digital asset vault system,
create a first connected-user group with a first subset of other users connected to the user, and
create a second connected-user group with a second subset of other users connected to the user, wherein the first subset of other users and the second subset of other users are not equal;
a content curation module to upload a first digital content item provided by the user;
an invitation module to:
receive a request from the user to invite one of the other users to edit the uploaded first digital content item, and
transmit an invitation to edit the uploaded first digital content item to the requested other user;
a template module to:
receive a selection of a first template from the user,
receive a second digital content item from the user specified for use with the selected first template, and
generate a customized template content item for the user by combining the selected first template with the second digital content item;
a digital trustee module to:
receive, from the user, identification of an entity to be a digital rights trustee upon the death of the user, and
generate trustee access credentials to be provided to the digital rights trustee upon the death of the user, wherein the trustee access credentials are different from the user access credentials; and
a death-file module to:
receive, from the user, identification of at least some of the stored content items as death-file content items, and
receive, from the user, specified actions to be automatically executed upon the death of the user in response to access by the digital rights trustee using the trustee access credentials, including at least:
identification of at least one death-file content item to be shared with a third party upon the death of the user, and
identification of at least one death-file content item to be deleted upon the death of the user such that the at least one death-file content item is never accessible to the digital rights trustee, and
execute, automatically in response to detected account access by the digital rights trustee using the trustee access credentials and without human intervention, the specified actions.

2. The system of claim 1, wherein the death-file module is further configured to cryptographically encrypt the death-file content items as part of a blockchain-based smart contract that provides for the release of a decryption key for decrypting at least some of the death-file content items only after the death of the user, wherein confirmation that the user has died is considered received upon receipt of the decryption key.

3. The system of claim 1, wherein the set of modules further comprises a questionnaire module to:
request information from the user by asking a first question;
receive a first response from the user to the first question; and
customize a subsequent question based on the first response from the user.

4. The system of claim 3, wherein the questionnaire module is further configured to:
generate a customized digital content item based on responses from the user to a series of questions; and
suggest that the user share the customized digital content item with at least one of the first connected-user group and the second connected-user group.

5. The system of claim 1, wherein each of the first digital content item and the second digital content item comprises at least one of a digital photograph, an audio recording, a video recording, an electronic document, an image a graphic, and text.

6. The system of claim 1, wherein the set of modules further comprises a template creation module to receive a user-created template, wherein the user-created template (i) includes at least one fixed element created by the user, and (ii) specifies at least one type of content item to be provided when utilizing the template.

7. The system of claim 6, wherein the set of modules further comprises a template marketplace module to:
receive the user-created template from the user to be offered for sale to other users of the digital asset vault system;
receive a request from one of the other users of the digital asset vault system to purchase the user-created template;
digitally deliver the user-created template to the requestor in exchange for payment; and
remit at least a portion of the payment to the user.

8. The system of claim 1, wherein the circle management module is configured to automatically create a third connected-user group that includes a union of the first subset of other users and the second subset of other users.

9. The system of claim 1, wherein the set of modules further comprises a moment creation module to:
prompt the user to provide a moment name in order to create a new moment content item;
receive a moment name from the user and, in response, create a new moment content item with the received moment name; and
prompt the user to add at least one of the following to the moment content item: a photograph, a document, a video, a playlist, a music file, and text.

10. The system of claim 9, wherein the moment creation module is further configured to:
receive, from the user, a selection of other users that are authorized to contribute digital content items to the moment content item;
receive, from an authorized other user, a shared digital content item to be added to the moment content item; and add the shared digital content item to the moment content item.

11. The system of claim 9, wherein the moment creation module is further configured to:
present moment template options to the user for selection; and
receive, from the user, a selection of one of the presented moment template options, wherein the moment name received from the user is provided in the context of the selected moment template.

12. The system of claim 11, wherein the moment templates presented to the user for selection comprise at least one of: a document template, a video blog template, a milestone template, a timeline template, a birthday template, a photo template, a multimedia template, an anniversary template, and an ancestry template.

13. The system of claim 12 wherein the moment templates presented to the user for selection are dynamically selected based upon personal information previously collected from the user, such that a moment template for an anniversary and a moment template for a birthday are only presented during the corresponding times of the year.

14. The system of claim 1, wherein the set of modules further comprises a story creation module to selectively:
present at least one of:
story templates to the user for the user to create a new story, and
story ideas to prompt the user to create a new story;
provide an editing interface for the user to edit a previously published story;
receive digital content items for inclusion in a story created by the user;
provide an interface for the user to continue working on an existing unpublished story; and
provide an interface for the user to publish a story and share the story with other users.

15. The system of claim 14, wherein the story creation module further comprises an interface to associate previously created moment content items with a story.

16. A digital asset vault system, comprising:
an onboarding subsystem to receive user personal data from a user to create a user account accessible via user access credentials;
a digital content curation subsystem to allow the user to:
select from a plurality of content item templates, including story content item templates and moment content item templates,
upload digital content items for inclusion into selected content item templates, and
store content items created by the user, including story content items and moment content items created by the user, in a data store of the digital asset vault system;
a digital trustee subsystem to:
receive, from the user, identification of an entity to be a digital rights trustee upon the death of the user; and
generate trustee access credentials to be provided to the digital rights trustee upon the death of the user, wherein the trustee access credentials are different from the user access credentials; and
a death-file subsystem to:
receive, from the user, identification of at least some of the stored content items as death-file content items,
receive, from the user, specified actions to be automatically executed upon the death of the user in response to access by the digital rights trustee using the trustee access credentials, including at least:
identification of at least one death-file content item to be shared with a third party upon the death of the user, and
identification of at least one death-file content item to be deleted upon the death of the user such that the at least one death-file content item is never accessible to the digital rights trustee, and
execute, automatically in response to detected account access by the digital rights trustee using the trustee access credentials and without human intervention, the specified actions.

* * * * *